Feb. 26, 1963    H. A. NAUDAIN    3,079,278
PRESSURE-SENSITIVE ADHESIVE TAPE FROM POLYPROPYLENE
Filed June 26, 1961
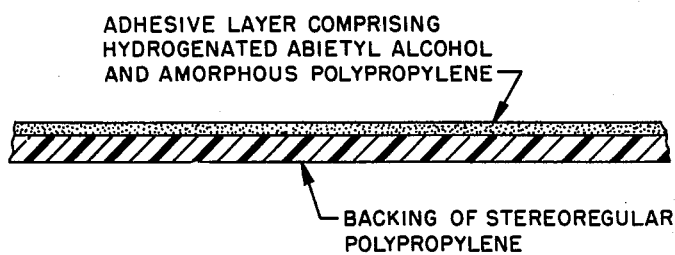
HOWARD A. NAUDAIN
INVENTOR.
BY Ernest J. Peterson
AGENT

United States Patent Office 3,079,278
Patented Feb. 26, 1963

3,079,278
PRESSURE-SENSITIVE ADHESIVE TAPE
FROM POLYPROPYLENE
Howard A. Naudain, Hockessin, Del., assignor to Hercules Powder Company, Wilmington, Del., a corporation of Delaware
Filed June 26, 1961, Ser. No. 119,329
2 Claims. (Cl. 117—122)

The present invention relates to a pressure-sensitive adhesive tape. More particularly, it relates to a pressure-sensitive adhesive tape comprising a backing of stereoregular polypropylene film and an adhesive comprising a mixture of amorphous polypropylene and hydrogenated abietyl alcohol.

Typically, a pressure-sensitive adhesive tape comprises a flexible backing which may be, for example, paper, plastic film or cloth, having a normally tacky, pressure-sensitive adhesive bonded thereto. A particularly well known and commonly used pressure-sensitive adhesive tape is one in which the flexible backing is cellophane. The pressure-sensitive cellophane tape on the market today has a three-fold balance of adhesion, cohesion, and viscoelasticity. Thus, although the tape is highly tacky, it can nevertheless be stripped from a smooth surface without delamination, splitting or transferring of the adhesive to the surface.

One of the newer plastics from which strong flexible film can be made is stereoregular, sometimes called isotactic, polypropylene. Film of this polymer is economically competitive with cellophane and has several advantages compared to cellophane, particularly improved water resistance and strength, and resistance to dimensional changes with changing humidity. On the basis of these qualities, film of stereoregular polypropylene offers obvious promise as a flexible backing for pressure-sensitive adhesive tape.

The manufacture of satisfactory pressure-sensitive tape from stereoregular polypropylene film is, however, not a simple matter because the nature of stereoregular polypropylene is such that the known pressure-sensitive adhesives do not adhere readily to the polymer. Hence, when these conventional adhesives are applied to a backing of stereoregular polypropylene film, they are easily stripped from the film. Therefore, stereoregular polypropylene has been unable to compete with cellophane as a backing for a pressure-sensitive tape for lack of a satisfactory adhesive.

It is known from the art (see U.S. 2,927,047 to Schülde et al.) that solid, amorphous polypropylene adheres quite strongly to a stereoregular polypropylene and, accordingly, the former polymer has been suggested as a primer for stereoregular polypropylene or as an adhesive for bonding stereoregular polypropylene to itself. Amorphous polypropylene is not, however, tacky at normal temperatures and, accordingly, it not per se useful as a pressure-sensitive adhesive.

In accordance with the present invention it has been found that amorphous polypropylene can be made permanently tacky by admixture with hydrogenated abietyl alcohol and that the resultant mixture is an excellent pressure-sensitive adhesive for use on a backing of stereoregular polypropylene film. Accordingly, the invention is directed to a pressure-sensitive adhesive tape which, as shown in the attached cross-sectional drawing, comprises a backing of stereoregular polypropylene film and an adhesive layer comprising a mixture of hydrogenated abietyl alcohol and solid amorphous polypropylene.

The adhesive composition employed in the invention is critical from the standpoint of both the adhesive, i.e., amorphous polypropylene and the tackifying ingredient, i.e., hydrogenated abietyl alcohol. Thus, for instance, satisfactory pressure-sensitive adhesives for stereoregular polypropylene film do not result when amorphous polypropylene is replaced with other adhesives disclosed for use in pressure-sensitive compositions, such as natural rubber, polychloroprene, and polyisobutylene. Similarly, the replacement of hydrogenated abietyl alcohol with materials that have been recommended as tackifiers in pressure-sensitive adhesive compositions leads to unsatisfactory results. These results indicate on one hand the difficulty of providing an adhesive that will adhere satisfactorily to stereoregular polypropylene and, on the other hand, the inability of amorphous polypropylene to respond generally to tackifying agents.

The following examples are presented in further illustration of the invention. Parts and percentages are by weight unless otherwise specified.

EXAMPLE 1

An adhesive solution was prepared by adding two parts of hydrogenated abietyl alcohol (a commercial mixture of tetrahydroabietyl alcohol and dihydroabietyl alcohol) to 10 parts of a 10% solution of amorphous polypropylene in n-heptane.

The amorphous polypropylene employed in this and all subsequent examples had a reduced specific viscosity of 2.8 determined on a 0.1% solution of the polymer in decahydronaphthalene at 135° C. and a molecular weight of about 430,000.

The adhesive solution was cast onto an unoriented 5-mil film of stereoregular polypropylene to give an as cast thickness of 25 mils. The coated film was then air dried at 90° to 100° C. for 10 minutes which resulted in a dried adhesive layer thickness of 3.0 mils. A piece of the coated film measuring 1 inch by 3 inches was then applied by finger pressure to a 1.5 mil uniaxially oriented film of stereoregular polypropylene. The peel strength of the pressure-sensitive film was then determined on a Scott model LACC tester at the rate of 12 inches per minute, using a T-peel and allowing the stiffness of the two plastics, i.e., the backing and the substrate, to determine the exact angle of peel. The peel strength was found to be 5.0 pounds per inch of width. During the peeling the adhesive layer adhered firmly to its backing with no delamination or splitting of the adhesive layer. Also, samples of the tape were stored for weeks without loss of tackiness.

EXAMPLES 2 TO 11

The general procedure of Example 1 was followed to prepare pressure-sensitive adhesive tapes employing as backing unoriented 5-mil film of stereoregular polypropylene film and uniaxially oriented 2-mil film of stereoregular polypropylene film, and employing adhesive compositions in which the weight ratio of hydrogenated abietyl alcohol to amorphous polypropylene was varied over a wide range. The results are tabulated below:

Table I

| Ex. No. | Ratio, Hydrogenated abietyl Alcohol/ Amorphous Polypropylene | Backing | Thickness of Dry Adhesive (mils) | Peel Strength (lb./in. width) |
|---|---|---|---|---|
| 1 | 2/1 | Uniaxially oriented polypropylene film. | 2.7 | 3.1 |
| 2 | 2/1 | do | 1.0 | 2.2 |
| 3 | 3/2 | do | 2.0 | 2.1 |
| 4 | 3/2 | do | 1.5 | 2.0 |
| 5 | 2/1 | Unoriented polypropylene film. | 2.5 | 4.3 |
| 6 | 2/1 | do | 1.5 | 3.7 |
| 7 | 3/2 | do | 2.1 | 3.6 |
| 8 | 3/2 | do | 1.4 | 2.7 |
| 9 | 1/1 | do | ≅2 | 1.9 |
| 10 | 3/4 | do | ≅2 | 1.8 |
| 11 | 1/2 | do | ≅2 | 1.7 |

There was no delamination or splitting of the adhesive layer in any of the foregoing experiments. The data show that the ratio of tackifier to amorphous polypropylene is desirably from about 1.5:1 to 2:1 for optimum strength. However, ratios as low as 0.5 to 1 give a satisfactory tape.

EXAMPLE 12

The pressure-sensitive adhesive tapes of Examples 6 and 7 were applied by finger pressure to various other substrates including glass, cellophane, and poly(ethylene terephthalate). The peel strength results are tabulated below:

Table II

| Substrate | Peel Strengths (lb./in. width) | |
|---|---|---|
| | Tape of Example 6 | Tape of Example 7 |
| Glass | 5.4 | 4.3 |
| Cellophane film | 2.3 | 2.0 |
| Poly(ethylene terephthalate) film | 1.8 | 1.7 |

In all cases there was no transfer of adhesive from the tape backing to the substrate.

COMPARATIVE EXAMPLES

In other experiments the criticality of the adhesive characteristics of the invention to both of the components has been demonstrated by attempting various substitutions. In one series of experiments various commercial materials that have been recommend as tackifying ingredients for other polymers were evaluated as tackifiers for amorphous polypropylene. The adhesives resulting from the substitutions were applied to unoriented 5-mil film of stereoregular polypropylene and the resultant "pressure-sensitive" tapes were examined qualitatively for degree of tack. It was found that none of the potential tackifiers so examined were comparable to hydrogenated abietyl alcohol in providing pressure-sensitive properties to the amorphous polypropylene. The materials tested were hydrogenated rosin, chlorinated paraffin, the glycerol ester of hydrogenated rosin, polymerized sulfate turpentine, α-pinene dimer, terpene resins, and hydrocarbon resins. Of these, only chlorinated paraffin imparted more than a very slight surface tack to the amorphous polypropylene, but the surface tack disappeared after a short period of storage.

In another series of experiments pressure-sensitive tapes were prepared as described in Example 1 but substituting various polymers for amorphous polypropylene (while retaining hydrogenated abietyl alcohol as a tackifier) and the tapes tested for peel strength as described in Example 1. The results were as follows:

Table III

| | Natural Rubber | Polyisobutylene | Polychloroprene |
|---|---|---|---|
| Percent Solids in Base Solution | 10 | 9 | 12. |
| Solvent | n-heptane | n-heptane | toluene. |
| Ratio, Hydrogenated Abietyl Alcohol/Rubber | 3:2 | 3:2 | 3:2. |
| Total Percent Solids in Adhesive Solution | 21.8 | 19.8 | 25.4. |
| Wet Cast Thickness | 15 | 15 | 15. |
| Average Peel Strength | 0.8 | 1.9 | 0.8. |
| Quality of Adhesive Bond to Backing | Very Poor (100% transfer). | Very Poor (100% transfer). | Poor (50% transfer). |

It can be seen from the data in the preceding table that the other polymers examined do not provide adhesives that adhere satisfactorily to the stereoregular polypropylene backing because in each case there was transfer of adhesive to the substrate when the tape was peeled from the substrate.

The examples have demonstrated the unique qualities of an adhesive tape comprising a backing of stereoregular polypropylene film and an adhesive layer comprising a mixture of solid amorphous polypropylene and hydrogenated abietyl alcohol.

The term "hydrogenated abietyl alcohol" is employed in the specification in generic sense to include the alcohols derived from the hydrogenation of abietyl alcohol, specifically tetrahydroabietyl alcohol and dihydroabietyl alcohol. The hydrogenated abietyl alcohol of commerce is essentially a mixture of these two alcohols. However, either of the hydrogenated alcohols may be used alone in the practice of the invention to give results equivalent to the commercial mixture.

In preparing the adhesive composition that is employed in the invention the hydrogenated abietyl alcohol and amorphous polypropylene are simply admixed in the desired ratio. The prefered procedure to mix the two ingredients in solution in a suitable solvent such as paraffinic hydrocarbon in the ratio of hydrogenated abietyl alcohol to amorphous polypropylene may reasonably vary from about 0.5:1 to about 3:1 by weight.

The solid amorphous polypropylene employed as the other component of the adhesive composition may vary widely in molecular weight but desirably will have a molecular weight of from about 120,000 to about 1,000,000.

The pressure-sensitive adhesive tape of the invention is easily prepared by applying a layer of the adhesive solution to one or both surfaces of a stereoregular polypropylene film and evaporating the solid from the adhesive by heating to an elevated temperature. The amount of adhesive applied to the backing film is variable over a wide range. Preferably, the amount should be such as to provide, after drying, an adhesive layer having a thickness of about 0.5 mil to about 5 mils.

What I claim and desire to protect by Letters Patent is:

1. A pressure-sensitive adhesive tape comprising a backing of stereoregular polypropylene film and an adhesive layer comprising a mixture of hydrogenated abietyl alcohol and solid amorphous polypropylene in which the weight ratio of hydrogenated abietyl alcohol to solid amorphous polypropylene is from 0.5:1 to 3:1.

2. The tape of claim 1 in which the amorphous polypropylene has a molecular weight of from about 120,000 to 1,000,000.

References Cited in the file of this patent

UNITED STATES PATENTS

| 2,825,721 | Hogan et al. | Mar. 4, 1958 |
| 2,927,047 | Schulde et al. | Mar. 1, 1960 |
| 2,947,650 | Gerhardt et al. | Aug. 2, 1960 |